United States Patent [19]

Shimomura et al.

[11] Patent Number: 4,716,876
[45] Date of Patent: Jan. 5, 1988

[54] FUEL INJECTION CONTROL SYSTEM FOR INTERNAL COMBUSTION ENGINE

[75] Inventors: Setsuhiro Shimomura; Yukinobu Nishimura, both of Hyogo, Japan

[73] Assignee: Mitsubishi Denki Kabushiki Kaisha, Tokyo, Japan

[21] Appl. No.: 921,515

[22] Filed: Oct. 22, 1986

[30] Foreign Application Priority Data

Oct. 22, 1985 [JP] Japan .................. 60-238126

[51] Int. Cl.$^4$ .............................. F02P 3/00
[52] U.S. Cl. .................... 123/480; 123/494; 73/118.2
[58] Field of Search .......... 123/488, 494, 480; 73/118.2; 364/431.05

[56] References Cited

U.S. PATENT DOCUMENTS

| | | | |
|---|---|---|---|
| 4,205,377 | 5/1980 | Oyama | 123/494 |
| 4,523,284 | 6/1985 | Amano | 364/431.05 |
| 4,612,895 | 9/1986 | Kurdiwa | 123/494 |
| 4,644,474 | 2/1987 | Aposchanski | 123/494 |

FOREIGN PATENT DOCUMENTS

| | | | |
|---|---|---|---|
| 0154509 | 9/1985 | European Pat. Off. | 123/494 |
| 2534708 | 4/1984 | France | 123/494 |
| 57-73830 | 10/1980 | Japan | 123/494 |

OTHER PUBLICATIONS

Patent Abstracts of Japan, vol. 8, No. 12, Jan. 19, 1984.
Patent Abstracts of Japan, vol. 8, No. 61, Mar. 23, 1984.

*Primary Examiner*—Ronald B. Cox
*Attorney, Agent, or Firm*—Sughrue, Mion, Zinn, Macpeak and Seas

[57] ABSTRACT

A fuel injection control system in which the output of a hot-wire air flow sensor is limited to a maximum value in order to compensate for return blow at low-speed, high-power conditions. However, the maximum value is adjusted for altitude and temperature.

5 Claims, 6 Drawing Figures

FUEL INJECTION CONTROL SYSTEM FOR INTERNAL COMBUSTION ENGINE

BACKGROUND OF THE INVENTION

1. Field of the Invention

This invention relates to a fuel injection control apparatus for an internal combustion engine of a car, which is concerned with processing measured values of suction air quantity in the internal combustion engine.

2. Background of the Invention

A fuel injection control apparatus for an internal combustion engine of a car of the kind described above is shown in FIG. 1. An electromagnetically driven injector (fuel injection valve) 2 supplies fuel to the internal combustion engine 1. A hot-wire air-flow sensor 3 detects the quantity of air sucked into the engine. A throttle valve 5 provided at a part of a suction pipe 6 regulates the quantity of air sucked into the engine. A water temperature sensor 7 detects the temperature of the engine. A controller 8 computes the quantity of fuel to be supplied to the engine on the basis of an air quantity signal supplied from the air-flow sensor 3 and thereby applies a pulse width corresponding to the required fuel quantity to the injector 2. Further, an igniter 9 generates a pulse signal for the controller 8 at every predetermined rotational angle of the engine. Also shown is a fuel tank 11. A fuel pump 12 applies pressure to the fuel in the tank 11. A fuel pressure regulator 13 maintains constant the pressure of the fuel supplied to the injector 2. Finally, there is shown an exhaust pipe 14. Further, the controller 8 comprises elements 80–84, more specifically an input interface circuit 80, a microprocessor 81 and a ROM 82. The microprocessor 81 is arranged to process various kinds of input signals, to compute the quantity of fuel to be supplied to the suction pipe 6, and from thence to the combustion chamber as determined by the execution of a predetermined program stored in advance in the ROM 82, and to control a drive signal to the injector 2. A RAM 83 temporarily stores data during the execution of computation by the microprocessor 81. An output interface circuit 84 drives the injector 2.

In the operation of the thus arranged conventional engine control apparatus, the quantity of fuel to be supplied to the engine is calculated by the controller 8 on the basis of a suction air quantity signal detected by the air flow sensor 3. At the same time, the rotational frequency of the engine is calculated on the basis of a rotation pulse frequency obtained from the igniter 9, so that a fuel quantity per engine revolution can be calculated. The controller 8 applies a required pulse width to the injector 2 in synchronism with an ignition pulse. The pulse width applied to the injector 2 is corrected so as to be increased or decreased in accordance with a temperature signal generated from the water temperature sensor 7 because it is necessary to set the required air/fuel ratio of the engine to the rich side when the temperature of the engine is low. Further, control is made so as to correct the air/fuel ratio to the rich side by detecting the acceleration of the engine on the basis of a change in the opening of the throttle valve 5.

In the conventional apparatus as described above, however, the hot-wire air-flow sensor 3 used for the fuel control has the desirable characteristic that the provision of new means for correcting atmospheric pressure is not necessary. This arises because the sensor 3 can detect the quantity of suction air by weight. However, the sensor 3 is sensitive to the return blow of air produced by valve overlapping of the engine so that it may detect a signal representing the quantity of suction air in which the quantity of the return-blow air is also included. Accordingly, the output signal generated by the air-flow sensor 3 may express a quantity of suction air which is larger than the actual quantity of the air. Particularly in the low-speed, full-power operation of the engine, return blow is apt to occur. For example, as when in FIG. 2, although the true suction air is not sucked during time $t_R$, the measured suction air quantity has such a wave form as shown in FIG. 2, which would seem to indicate that the suction air is increased by the return blow. As the result, the output of the air-flow sensor 3 expresses values, as shown in FIG. 3, considerably larger than the true values (shown by broken lines in the drawings), in the low-speed, full-power region. Although varying with the layout of the engine, the suction system, or the like, the error due to the return blow generally reaches about 50% at the maximum so that the sensor 3 cannot be put into practical use as it is.

In order to compensate for such an error, there has been proposed a method in which values for the maximum quantity of suction air (including variations) to be sucked in the engine are set in advance in the ROM 82. As a result as shown in FIG. 4, the output signal a generated from the air-flow sensor 3 is disregarded and clipped to a line of values as shown by "MAX" which are slightly larger (for example, 10%) than an average value b of the true suction air quantity. In this method, however, the clipping values represented by "MAX" imply that the maximum suction air quantity is set for engine operating conditions at sea level and at an ordinary temperature. Accordingly, the air/fuel ratio is greatly shifted to the rich side in the condition of low atmospheric pressure while running at high altitudes or in the case where the temperature of suction air is high, so that there is the possibility of increased fuel cost as well as the possibility of an accidental fire. Further, there is the corresponding problem that the air/fuel ratio is shifted to the lead side where the temperature of the suction air is low.

There has been proposed a method in which wave forms are first determined to be affected by return blow and are then subjected to subtraction to thereby correct a detection error in an air-flow sensor 3 due to such return blow of suction air. However, the waveforms due to the return blow vary depending on both the rotational frequency of the engine and the opening of the throttle valve. Accordingly, it has been impossible to perform accurate correction.

Thus, the conventional fuel injection control apparatus, the problem exists that the hot-wire air-flow sensor 3 detects the suction air quantity as a value larger than the true value thereof because of the return blow of air produced in low-speed, full-power operation, so that the air/fuel ratio cannot be controlled appropriately in a certain running region.

SUMMARY OF THE INVENTION

Therefore, an object of the present invention is to solve the above-discussed problems.

More specifically, an object of the invention is to provide a fuel injection control apparatus for an internal combustion engine, which is arranged to make it possible to control the air/fuel ratio correctly even in the case where the ambient temperature differs from the usual.

The fuel injection control system for an internal combustion engine according to the present invention comprises means for limiting to a predetermined maximum value either an output of an air-flow sensor or a quantity of supplied fuel based on the output of the air-flow sensor. The invention further comprises means for correcting the maximum value on the basis of a rotational frequency of the engine, the output of the air-flow sensor and an opening of a suction throttle valve.

BRIEF DESCRIPTION OF THE DRAWINGS

FIG. 4 is a graph showing a prior art method for correcting the error due to return blow in.

DETAILED DESCRIPTION OF THE PREFERRED EMBODIMENTS

According to the invention, when the output of the air-flow sensor or the like becomes larger than a true value, the output is limited to a predetermined maximum value, and when the air density differs from a reference value, the air density is corrected by the correcting means.

Figure 1:
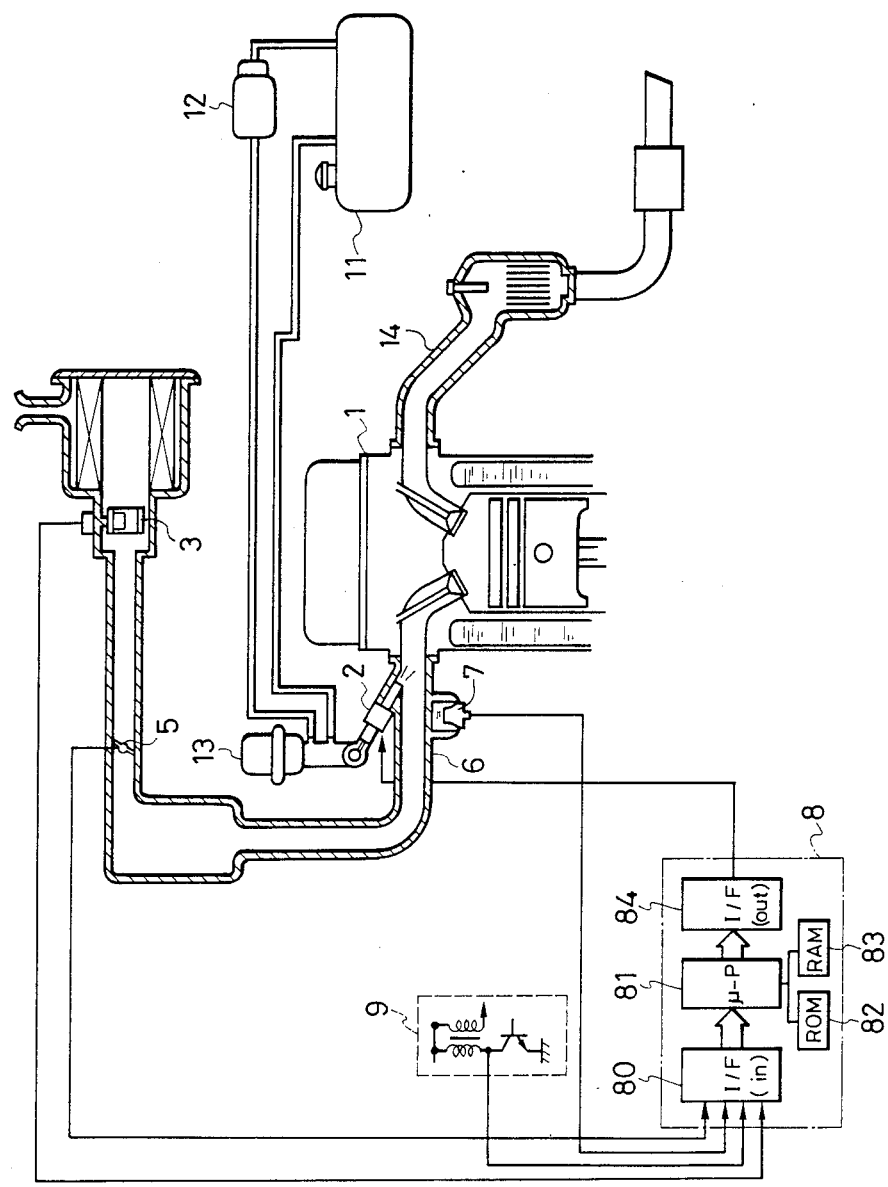
FIG. 1 is a diagram of an arrangement of the system in accordance with both the prior art and the present invention.
Figure 2:
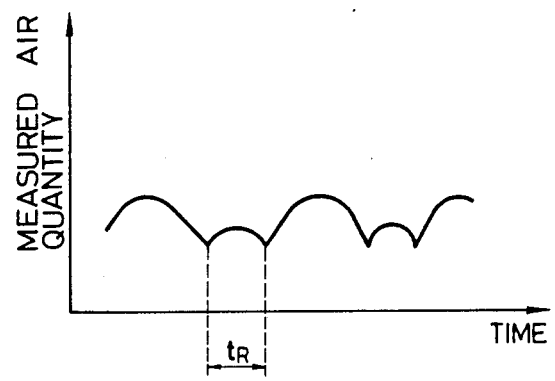
FIGS. 2 and 3 are respectively a characteristic graph of the detected suction air quantity and a characteristic graph of the output of an air-flow sensor in the case where return blow occurs.
Figure 5:
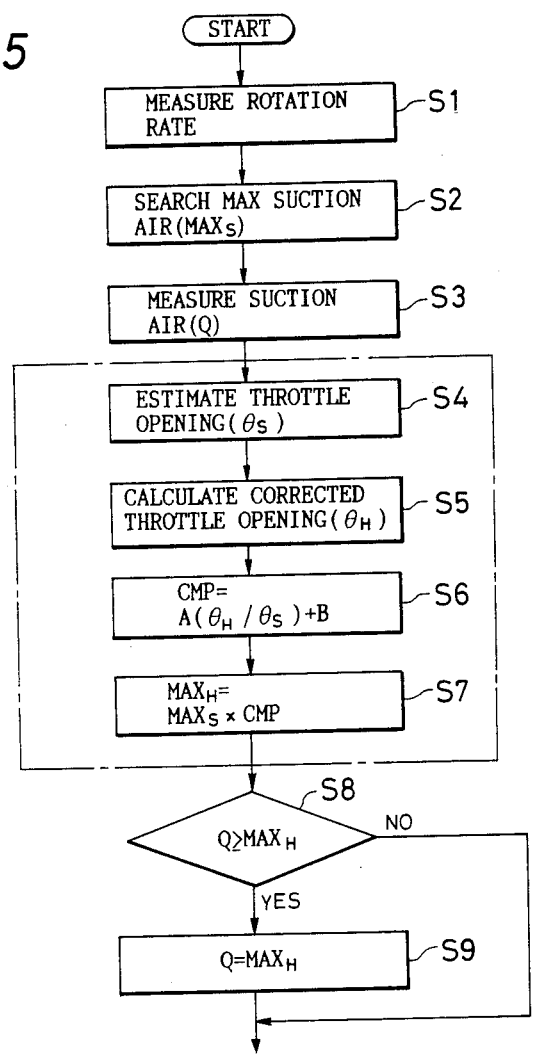
FIG. 5 is a flow chart showing the operation of important parts of the system according to the present invention.

An embodiment of the present invention will be described hereunder with reference to the drawings. The construction of the system according to this embodiment is not different from that of FIG. 1 in appearance but is different in the electronic functions of, for example, the ROM 82 and the like. FIG. 5 is a flow chart showing the operation of the system according to this embodiment which is particularly different from the prior art in the part surrounded by the one-dotted chain lines. In the drawing, parts having no direct relation to the present invention are not shown. First, in step S1 the rotational frequency N of the engine is determined from the igniter 9. In step S2, the maximum suction air quantity $MAX_S$ corresponding to the rotational frequency is retrieved from the ROM 82 on the basis of the rotational frequency N. To perform the retrieval, a prestored function is executed by the microprocessor 81 with the rotational frequency N as an input. A data map is retrieved from the ROM 82 in which data of $MAX_S$ as a function of N have been stored in advance corresponding to the rotational frequency. The stored data of $MAX_S$ are those proper for sea level operation. Next, in step S3 the measured suction air quantity Q of the engine is read.

Figure 3:
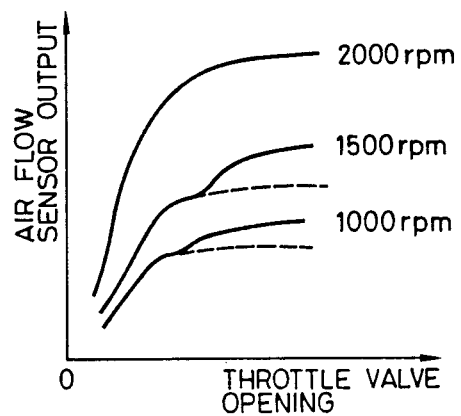
Figure 4:
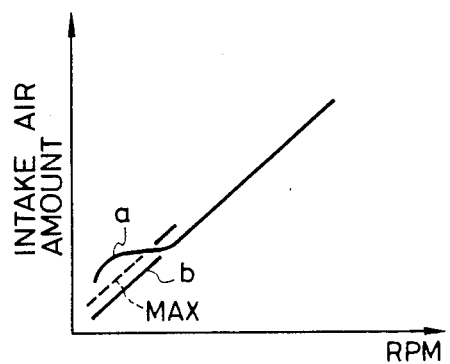

Although in the conventional system the procedure at this point jumps to step S8 from step S3, according to this embodiment the procedure continues to steps S4 through S7 which are concerned with correcting for return blow. However, as is apparent from FIG. 3, there are limiting values of the engine speed, throttle valve opening or sensed air flow above or blow which there is no effect from return blow. Accordingly, in these regions, a preliminary check can determine that the corrections of steps S4 through S7 are not required.

Figure 6:
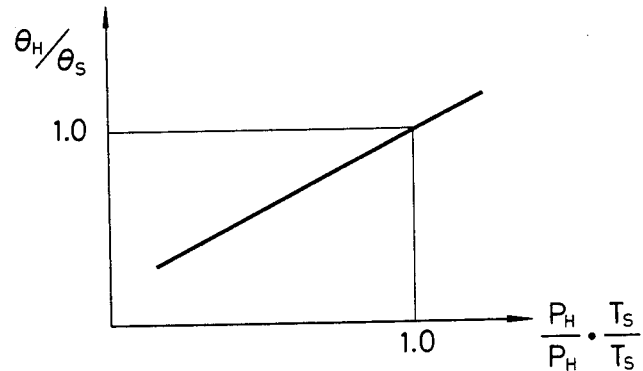
FIG. 6 is a graph showing the relationship between the air density and the throttle valve opening in accordance with the present invention.

In step S4, the estimated opening $\theta_S$ of the suction throttle valve 5 is calculated by use of the actual rotational frequency N and the suction air quantity Q. In order to obtain the estimated opening $\theta_S$, a data map is retrieved from the ROM 82 in which the data of rotational frequency N and the relationship between the suction air quantity Q and the throttle valve opening $\theta_S$ for sea-level operating have been stored in advance. In step S5 the actual opening $\theta_H$ of the throttle valve is calculated. However it is possible to measure the actual throttle opening with a sensor attached to the throttle valve 5. When the engine is at sea level, $\theta_H = \theta_S$. When the engine is operating at high altitude, on the other hand, the throttle opening is greater, $\theta_H > \theta_S$, because it is necessary to further open the throttle valve 5 to make the power output equal to that at sea level. In this embodiment, parameters related to the altitude and air density in which the engine is operated are calculated on the basis of the above-described relationship in the throttle valve opening to thereby correct the maximum suction air quantity MAX. The relationship between the air density and $\theta_S/\theta_H$ are experimentally determined, as shown in FIG. 6. In the drawing, $P_H$ represents the ambient atmospheric pressure and $P_S$ represents sea-level atmospheric pressure. Also $T_H$ represents the ambient suction air temperature and $T_S$ represents the reference suction air temperature at which the data map of the throttle valve opening $\theta_S$ has been set at sea level. Accordingly, $P_H \cdot T_S / P_S \cdot T_H$ represents the ratio of the actual air density to the reference air density at sea level. It is apparent from FIG. 6 that the value of the ratio $\theta_H/\theta_S$ has an essentially linear correlation with the air density. Accordingly, the maximum suction air quantity $MAX_S$ determined at the sea level can be corrected with the calculation of the actual air density corresponding to the estimation of the ratio $\theta_H/\theta_S$ to thereby calculate the maximum suction air quantity $MAX_H$ suitable at that altitude.

Needless to say, additional ambient temperature and pressure sensors (not shown) provide input signals to the input interface circuit 80 and the microprocessor 82. The description of FIG. 5 will now continue. In step S6, the ratio $\theta_H/\theta_S$ is calculated from the values of $\theta_S$ and $\theta_H$ obtained previously, and, for example, a correction factor CMP is calculated by the function $CPM = A(\theta_H/\theta_S) + B$, in which A and B are constants in the case where the correlation of FIG. 6 is regarded as a linear one. Therefore, CMP is a value of a parameter representing $(P_H/P_S)\cdot(T_S/T_H)$, that is, the ratio of the actual suction air density at the present place to the reference suction air density at sea level. Alternatively, the calculation of CMP can be executed by operating any one of various functions having $\theta_H$ and $\theta_S$ as main parameters or by retrieving a data map. Next, in step S7, a calculation is performed, namely, $MAX_H = MAX_S \times CMP$. This calculation is based on the maximum suction air quantity $MAX_S$ retrieved in step S2 and the correction value CMP obtained in step S6, so that the maximum suction air quantity $MAX_H$ corresponding to the present altitude and is temperature calculated. It is a matter of course that the calculation is based on the proportional relationship between the suction air mass per stroke of the engine and the air density at that time, and the relationship $CMP = (P_H/P_S)\cdot(T_S/T_H)$. Next, in step S8 the suction air quantity Q read in the step S3 is compared with the maximum suction air quantity $MAX_H$, and the latter value is carried forward in step S9 when $Q \geq MAX_H$. If $Q < MAX_H$, the read-out quantity Q is directly supplied as it is to the next process (not shown) for calculating the fuel supply quantity.

Although the embodiment of FIG. 5 shows the case where the maximum suction air quantity is corrected, it is a matter of course that the present invention is applicable to the case where the fuel quantity supplied correspondingly to the suction air quantity Q is corrected and, in more detail, the maximum value of the drive pulse width for the injector 2 is corrected by the correction factor CMP. The close relationship between the air density and the throttle valve opening as shown in FIG. 6 holds in the limited conditions: (1) the case where the suction air quantity of the engine is rate-limited by the throttle valve 5, that is, the case where the opening of the throttle valve 5 is within a fixed range; (2) the case where there is no return blow of the suction air and accordingly the suction air quantity or the rotational frequency is within a range possible to measure exactly; (3) the case where the engine is not in a transient state, such as being warmed up or during acceleration or deceleration; etc. Accordingly, it is preferable that the calculation of the correction factor CMP in FIG. 6 is executed only when the above-mentioned conditions are satisfied. In addition, the occurrence of slight changes in the correction factor CMP is not avoidable even in the above conditions. It is, therefore, more preferable that the correction factor CMP be smoothed by a time filter having a suitable frequency characteristic before used for correction. Furthermore, because the occurrence of changes in the corrected maximum suction air quantity $MAX_H$ depending on slight changes in the correction factor CMP is undesirable at sea level, it is preferable to effect a protective processing for fixing the value CMP quantity in a range where the value CMP is close to unity.

As described above, according to the present invention, a necessary maximum value to limit the output of the conventional air-flow sensor or the like can be determined at sea level, and the value can be applied at high altitudes. Accordingly, the problem of the air/fuel ratio being shifted to the rich side can be eliminated in such a manner that the maximum value is corrected by a correction factor calculated correspondingly to the present altitude on the basis of the relationship among the throttle valve opening, the suction air quantity and the rotational frequency. Furthermore, parameters, such as the throttle valve opening, engine speed, ambient temperature and ambient pressure and the like, to be used for correction are those used conventionally and require no specific additional sensor. Accordingly the there is no increase in cost or the like.

What is claimed is:

1. A fuel injection control system comprising:
   (a) an air-flow sensor (3) for detecting a quantity of suction air supplied to an internal combustion engine;
   (b) an injector (2) for injecting fuel into said engine;
   (c) a controller (8) for controlling a quantity of said injected fuel in response to an output of said air-flow sensor;
   (d) a throttle valve (5) for regulating a quantity of said suction air;
   (e) throttle valve opening detecting means for detecting an opening of said throttle valve;
   (f) rotational frequency detecting means (9) for detecting a rotational frequency of said engine;
   (g) means for limiting one of said quantity of said injected fuel or said output of said air-flow sensor to a maximum value; and
   (h) means for determining said maximum value in response to said output of said air-flow sensor and to outputs of said throttle valve opening detecting means and said rotational frequency detecting means, wherein said maximum value determining means includes:
   (i) searching means for finding a first maximum value of said one of said quantity of said injected fuel or said output of said air-flow sensor in response to said output of said rotational frequency detecting means; and
   correcting means for correcting said first maximum value in response to said outputs of said air-flow sensor, said throttle valve opening detecting means and said rotational frequency detecting means.

2. A fuel injection control system as recited in claim 1, wherein said correcting means are operative only within a predetermined range of at least one of said outputs of said air-flow sensor, said throttle valve opening detecting means and said rotation frequency detecting means.

3. A fuel injection control system as recited in claim 1, wherein said correcting means includes:
   estimating means for estimating a first value of said opening of said throttle valve in response to said outputs of said air-flow sensor and said rotational frequency detecting means; and
   ratio means for correcting said first maximum value according to a ratio of said first value to an actual value of said opening of said throttle valve.

4. A fuel injection control system as recited in claim 3, further comprising:
   temperature measuring means for measuring a temperature of said suction air;
   pressure measuring means for measuring a pressure of said suction air; and
   calculation means for calculating said actual valve of said opening of said throttle valve in respond to said temperature and pressue measuring means.

5. A fuel injection control system as recited in claim 1, wherein said air-flow sensor is a hot-wire air flow sensor.

* * * * *